United States Patent [19]
Tate

[11] Patent Number: 5,343,757
[45] Date of Patent: Sep. 6, 1994

[54] PRESSURE SENSOR
[75] Inventor: Kikuo Tate, Kawasaki, Japan
[73] Assignee: Fuji Koki Manufacturing Co., Ltd., Tokyo, Japan
[21] Appl. No.: 974,021
[22] Filed: Nov. 10, 1992
[30] Foreign Application Priority Data May 21, 1992 [JP] Japan ............... 4-033651[U]
May 21, 1992 [JP] Japan ............... 4-033652[U]

[51] Int. Cl.$^5$ .................. G01L 7/08; G01L 9/12
[52] U.S. Cl. ........................ 73/724; 73/718; 73/756; 361/283.3
[58] Field of Search .......... 73/724, 718, 756, 431; 361/283; 29/25.41

[56] References Cited
U.S. PATENT DOCUMENTS

| | | | |
|---|---|---|---|
| 4,414,851 | 11/1983 | Maglic | 73/706 |
| 4,716,492 | 12/1987 | Charboneau et al. | 361/283 |
| 4,718,278 | 1/1988 | Bergsma | 73/725 |
| 4,823,603 | 4/1989 | Ferran et al. | 73/724 |
| 4,875,135 | 10/1989 | Bishop et al. | 361/283 |
| 4,888,662 | 12/1989 | Bishop | 361/283 |
| 5,051,937 | 9/1991 | Kawate et al. | 73/724 |

Primary Examiner—Donald Woodiel
Attorney, Agent, or Firm—Kenyon & Kenyon

[57] ABSTRACT

Two half housings are connected each other, one has a fluid inlet port and the other supports an outer connector. The inner space thereof is airtightly partitioned by a capacitive pressure transducer. In the sealed space, a space ring and a circuit board are sequentially stacked on the transducer. The board has first and second connection holes for receiving a terminals of the transducer and a base end of the outer connector. The terminals is bent like a crank, and a terminal guide is formed in the peripheral wall of the spacer ring to guide the terminal into the first connection hole.

7 Claims, 7 Drawing Sheets

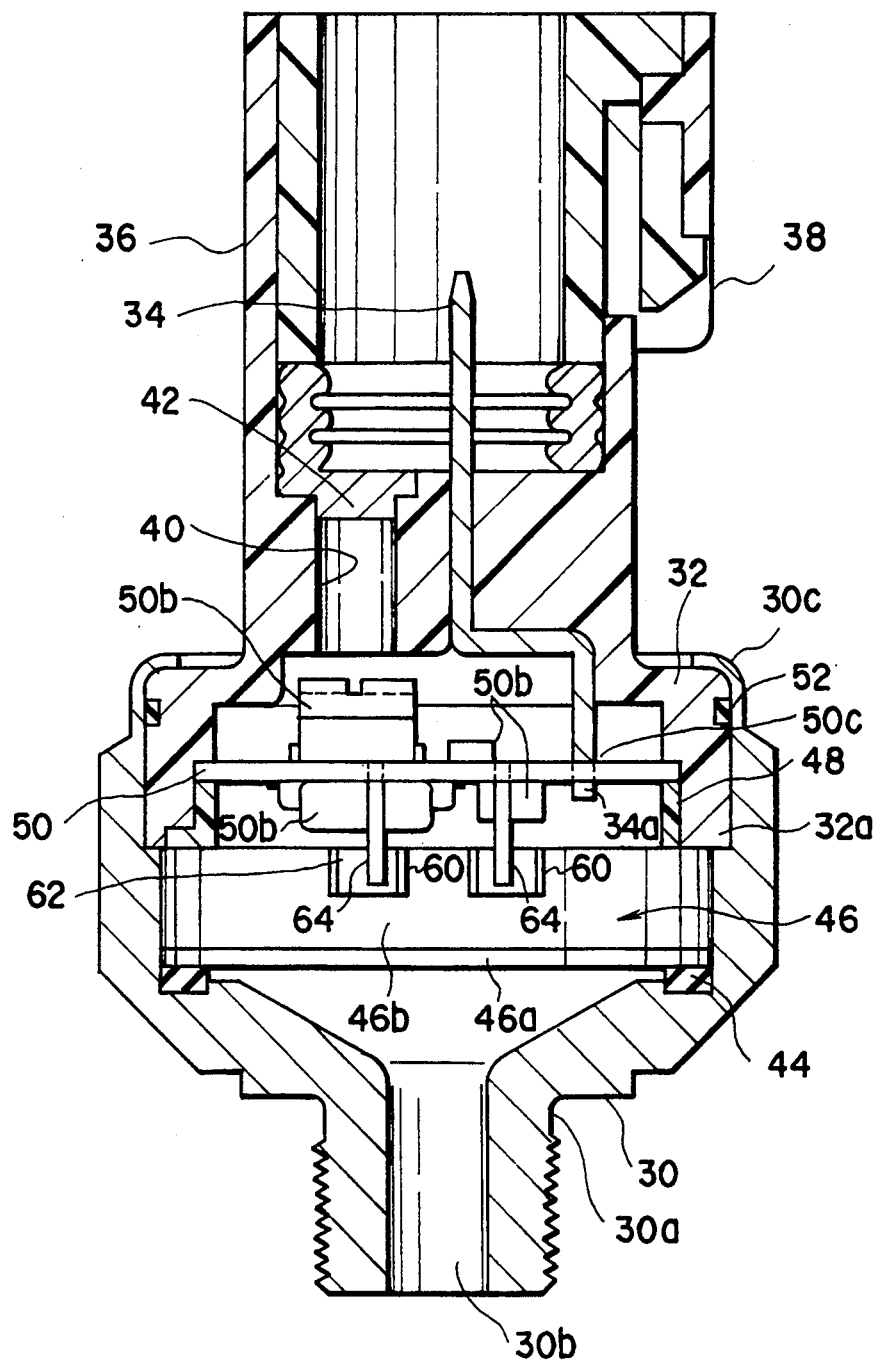
F I G. 8

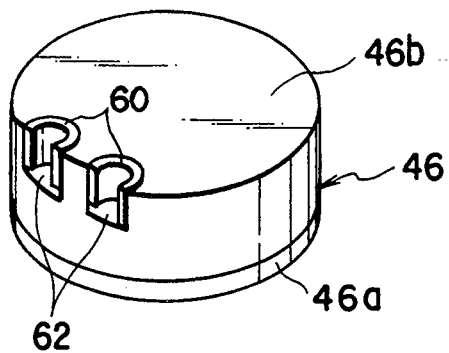
F I G. 9
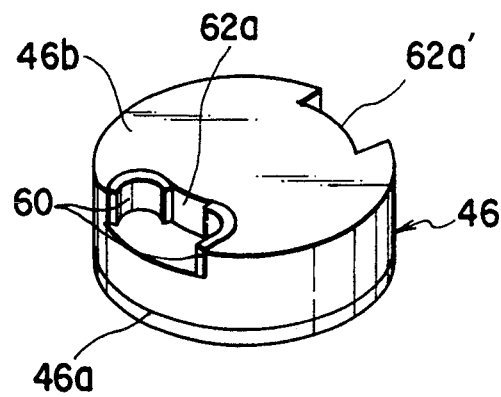
F I G. 10A
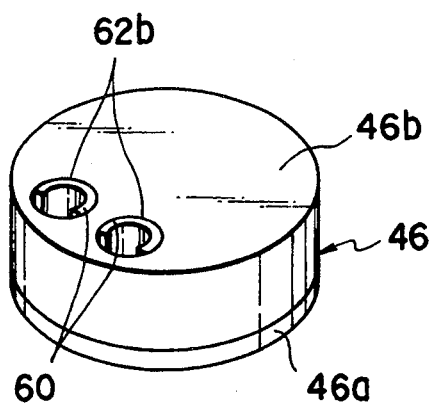
F I G. 10B
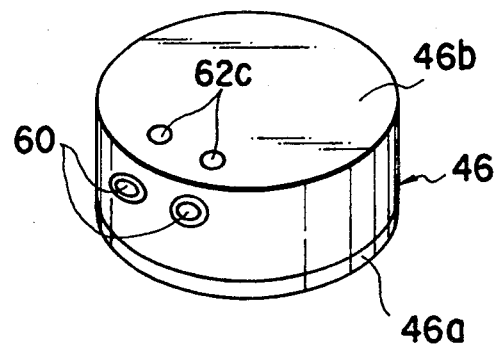
F I G. 10C

PRESSURE SENSOR

BACKGROUND OF THE INVENTION

1. Field of the Invention

The present invention relates to a pressure sensor having a capacitive pressure transducer.

2. Description of the Related Art

FIG. 1 shows a longitudinal section of a conventional pressure sensor of the above-mentioned type.

A housing 10 of the conventional pressure sensor has a metallic first cap-like half housing 10a. A fluid inlet channel 10b is formed at a top portion of the first half housing 10a so as to be adapted to communicate with a fluid passage (not shown).

An enlarged opening of the first half housing 10a is airtightly closed by a substantially disc-shaped capacitive pressure transducer 14 with an O-ring 12 interposed therebetween. The capacitive pressure transducer 14 has two rod-shaped electric terminals 14a extending in a direction away from the fluid inlet channel 10b of the first half housing 10a.

An annular spacer ring 16 made of non-conductive plastic material is placed on a peripheral edge portion of the side surface of the capacitive pressure transducer 14, which does not face to the fluid inlet channel 10b of the first half housing 10a. A circuit board 18 is supported on a side surface of the spacer ring 16 which does not face to the capacitive pressure transducer 14.

Two electric terminals 14a of the capacitive pressure transducer 14 are inserted into two electric connection holes formed at predetermined positions of the circuit board 18, and electrically connected to an electric circuit formed on the circuit board 18.

The spacer ring 16 produces a predetermined space between the circuit board 18 and the capacitive pressure transducer 14. On the surface of the circuit board 18 facing to the capacitive pressure transducer 14 and on another surface thereof not facing to the transducer 14, there are arranged various electric or electronic parts 18a for performing a predetermined electronic signal processing based on a pressure corresponding electric signal sent from the capacitive pressure transducer 14.

At a plurality of predetermined positions of the surface of the circuit board 18 not facing to the capacitive pressure transducer 14, there are provided a plurality of sockets 18b for transmitting the electric signal from the circuit board 18.

A peripheral edge portion of an enlarged opening of a second cap-like half housing 10c made of non-conductive plastic material is placed on the peripheral edge portion of the surface of the circuit board 18 not facing to the capacitive pressure transducer 14. Various electric or electronic parts 18a and the plurality of sockets 18b on the surface of the circuit board not facing to the capacitive pressure transducer 14 are contained in an inner space of the second half housing 10c. A plurality of outer connection terminals 20 are supported at predetermined positions of the top portion of the second half housing 10c to be opposite to the plurality of sockets 18b, and long and thin base end portions 20a of the plurality of outer connection terminals 20 are inserted into the plurality of sockets 18b.

The spacer ring 16 and the second half housing 10c are surrounded by a skirt portion extending from the periphery of the enlarged opening of the first half housing 10a in a direction away from the fluid inlet channel 10b. The second half housing 10c is connected to the first half housing 10a by engaging the extending end of the skirt portion of the first half housing 10a with a shoulder formed on the peripheral surface of the second half housing 10c. Thereby, the second half housing 10c and the first half housing 10a sandwich the spacer ring 16. Moreover, the spacer ring 16 and the peripheral edge portion of the enlarged opening of the first half housing 10a sandwich the O-ring 12 and the peripheral edge portions of both side surfaces of the capacitive pressure transducer 14. Furthermore, the spacer ring 16 and the peripheral edge portion of the enlarged opening of the second half housing 10c sandwich the peripheral edge portions of both side surfaces of the circuit board 18.

The plurality of outer connection terminals 20 of the top portion of the second half housing 10c extend in a direction away from the top portion along a longitudinal center line of the second half housing 10c, and are surrounded with a socket guiding cylindrical portion 22 formed on the top portion.

In the area of the ton portion, surrounded by the socket guiding cylindrical portion 22, openings 24 are formed to be opposed to the predetermined electric or electronic parts 18a of the circuit board 18 contained in the inner space of the second half housing 10c. The openings 24 are covered with a dust and water proof cap 26, and the predetermined electric or electronic parts 18a can be adjusted from the outer space through the openings 24 after detaching the dust and water proof cap 26.

The above-structured conventional pressure sensor is formed as follows. First, the spacer ring 16 is sandwiched by the capacitive pressure transducer 14 and the circuit board 18, then the transducer 14 and the circuit board 18 are electrically connected to each other, and finally a spacer ring unit is structured. The first half housing 10a and the second half housing 10c are mutually connected to each other in a state that the spacer ring unit is sandwiched therebetween. Thereby, the assembly of the pressure sensor is finished.

However, in such a conventional pressure sensor, the two electric terminals 14a of the capacitive pressure transducer 14 are easily bent. Also, it is difficult to obtain high positional accuracy of the terminals 14a. Therefore, the electrical connection between the capacitive pressure transducer 14 and the circuit board 18 through the terminals 14a in the state that the spacer ring 16 is sandwiched therebetween is manually performed.

SUMMARY OF THE INVENTION

The present invention has been made to solve the above problem, and an object of the present invention is to provide a pressure sensor which is easily assembled and is suitable for assembly by a machine.

In order to achieve the above object, the present invention provides a pressure sensor comprising: a first cap-like half housing which has a fluid inlet channel at its top portion; a capacitive pressure transducer which is mounted on an enlarged opening of the first half housing, airtightly partitions the enlarged opening, and has a terminal member extending in a direction away from the fluid inlet channel of the first half housing; an annular spacer ring which is placed on a peripheral edge portion of a side surface of the capacitive pressure transducer, positioned at a back side of another side surface facing to the the fluid inlet channel; a circuit board which is placed on a side surface of the spacer ring, positioned at a back side of another side surface facing to the capacitive pressure transducer, and has a first electrical connection terminal insertion hole and a second electrical connection terminal insertion hole being independent of the first electrical connection terminal insertion hole and receiving an elongated portion of the terminal member of the capacitive pressure transducer; and a second cap-like half housing which supports an outer connection terminal, is placed on a peripheral edge portion of a side surface of the circuit board, positioned at a back side of another side surface facing to the spacer ring, and is engaged with the first half housing in a state that an end portion of the outer connection terminal is inserted into the first electrical terminal insertion hole of the circuit board, and the capacitive pressure transducer, the spacer ring, and the circuit board are sandwiched by the first and second half housings, wherein the terminal member of the capacitive pressure transducer is bent like a crank and a terminal member guiding portion is formed in a peripheral wall of the spacer ring to receive the terminal member of the capacitive pressure transducer and to guide the terminal member to the second electrical connection terminal insertion hole of the circuit board.

In the above-structured pressure sensor of the present invention, the crank-like bent terminal member of the capacitive pressure transducer can easily adjust a position of its extending end relative to the capacitive pressure transducer. Also, the terminal member guiding portion formed in the peripheral wall of the spacer ring, makes the insertion of the extending end of the terminal member of the capacitive pressure transducer into the electrical connection hole of the circuit board and ensure it.

Therefore, the above-structured pressure sensor of the present invention can be easily assembled, and is suitable for assembly by a machine.

In the above-structured pressure sensor of the present invention, it is preferable that an opening is formed in a part of the terminal member guiding portion of the peripheral wall of the spacer ring to allow access from an outer space to the extending end portion of the terminal member and the electrical connection hole of the circuit board.

Due to the opening, the electrical connection between the terminal member of the capacitive pressure transducer and the electrical connection hole of the circuit board can be easily made.

In order to achieve the object of the present invention, another pressure sensor according to the present invention comprises: a first cap-like half housing which has a fluid inlet channel at its top portion; a capacitive pressure transducer which is mounted on an enlarged opening of the first half housing, and airtightly partitions the enlarged opening; an annular spacer ring which is placed on a peripheral edge portion of a side surface of the capacitive pressure transducer, positioned at a back side of another side surface facing to the the fluid inlet channel; a circuit board which is placed on a side surface of the spacer ring, positioned at a back side of another side surface facing to the capacitive pressure transducer, and has an electrical connection terminal insertion hole; electrical connection means for electrically connecting the capacitive pressure transducer to the circuit board; and a second cap-like half housing which supports an outer connection terminal, is placed on a peripheral edge portion of a side surface of the circuit board, positioned at a back side of another side surface facing to the spacer ring, and is engaged with the first half housing in a state that an end portion of the outer connection terminal is inserted into the electrical terminal insertion hole of the circuit board, and the capacitive pressure transducer, the spacer ring, and the circuit board are sandwiched by the first and second half housings, wherein the electrical connection means is constructed by a rod-like terminal member projecting from the circuit board toward the capacitive pressure transducer, and the capacitive pressure transducer has an opening into which the projected end of the terminal member of the circuit board is inserted with play and an electrical connection terminal positioned in the opening and electrically connected to the projected end of the terminal member.

In the above-structured another pressure sensor of the present invention, the opening of the capacitive pressure transducer into which the projected end of the terminal member of the circuit board is inserted eliminates an accurately and relatively positional adjustment of the projected end of the terminal member of the circuit board relative to the capacitive pressure transducer, and the projected end of the terminal member can be easily inserted into the opening.

Therefore, the above-structured another pressure sensor of the present invention can be easily assembled, and is suitable for assembly by the machine.

In the above-structured another pressure sensor of the present invention, it is preferable that the opening has opening portions in the side surface and the peripheral surface of the capacitive pressure transducer, the side surface facing to the circuit board, and the electrical connection terminal is arranged on the inner peripheral surface of the opening.

According to the above structure, in a case that the circuit board and the capacitive pressure transducer are arranged to sandwich the spacer ring and the projected end of the terminal member of the circuit board is inserted into the opening portion in the side surface of the capacitive pressure transducer, the projected end of the terminal member can be easily connected to the electrical connection terminal in the opening through the opening portion in the peripheral surface of the capacitive pressure transducer, and the terminal connection work can be surely made.

It is preferable that a portion of the capacitive pressure transducer between the side surface opening portion and the peripheral surface opening portion are cut out.

Such an opening can be easily formed and enlarges the side surface opening portion, so that the insertion of the projected end of the terminal member into the side surface opening portion can be easily made. Moreover, since the area of the peripheral opening portion is also enlarged, the terminal connecting work can be easily made.

When the circuit board has at least one more terminal member for the capacitive pressure transducer in the above-structured another pressure sensor of the present invention, it is preferable that the opening of the capacitive pressure transducer is formed such that the respective projected ends of the above described one terminal member and at least one more terminal member are inserted thereto with play, and a plurality of electrical connection terminals corresponding to the respective projected ends of the above described one terminal member and at least one more terminal member are arranged on the inner peripheral surface of the opening.

According to the above structure, as compared with the case that the plurality of openings, which are independently formed to correspond to the above described one terminal member and at least one more terminal member, are formed in the capacitive pressure transducer, the works for forming the opening and for the arrangement of the each electric connection terminal on the corresponding inner peripheral surface can be easily performed.

With the above opening, at least one electrical or electronic part electrically connected to the plurality of electrical connection terminals can be arranged between the plurality of the electrical connection terminals. Thereby, the degree of freedom in an arrangement of the electrical or electronic parts on the circuit board can be improved. Also, the heights of the projections of the electric or electronic parts on the surface of the circuit board can be lowered.

The above described at least one electrical or electronic part can be a fixed capacitor or a variable capacitor. Since the capacitor is a relative large part in various electrical or electronic parts to be electrically connected to the circuit board, the above-mentioned technical advantage is enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 is a longitudinal sectional view of a pressure sensor according to another embodiment of the present invention;

FIG. 9 is a perspective view of the capacitive pressure transducer of the pressure sensor of FIG. 8;

FIG. 10A is a perspective view of a first modification of the capacitive pressure transducer of the pressure sensor of FIG. 8;

FIG. 10B is a perspective view of a second modification of the capacitive pressure transducer of the pressure sensor of FIG. 8;

FIG. 10C is a perspective view of a third modification of the capacitive pressure transducer of the pressure sensor of FIG. 8;

DETAILED DESCRIPTION OF THE PREFERRED EMBODIMENTS

One Embodiment

The following will be explain a pressure sensor of one embodiment of the present invention and one modification of a capacitive pressure transducer used in the pressure sensor with reference to FIGS. 2 to 7.

Figure 1:
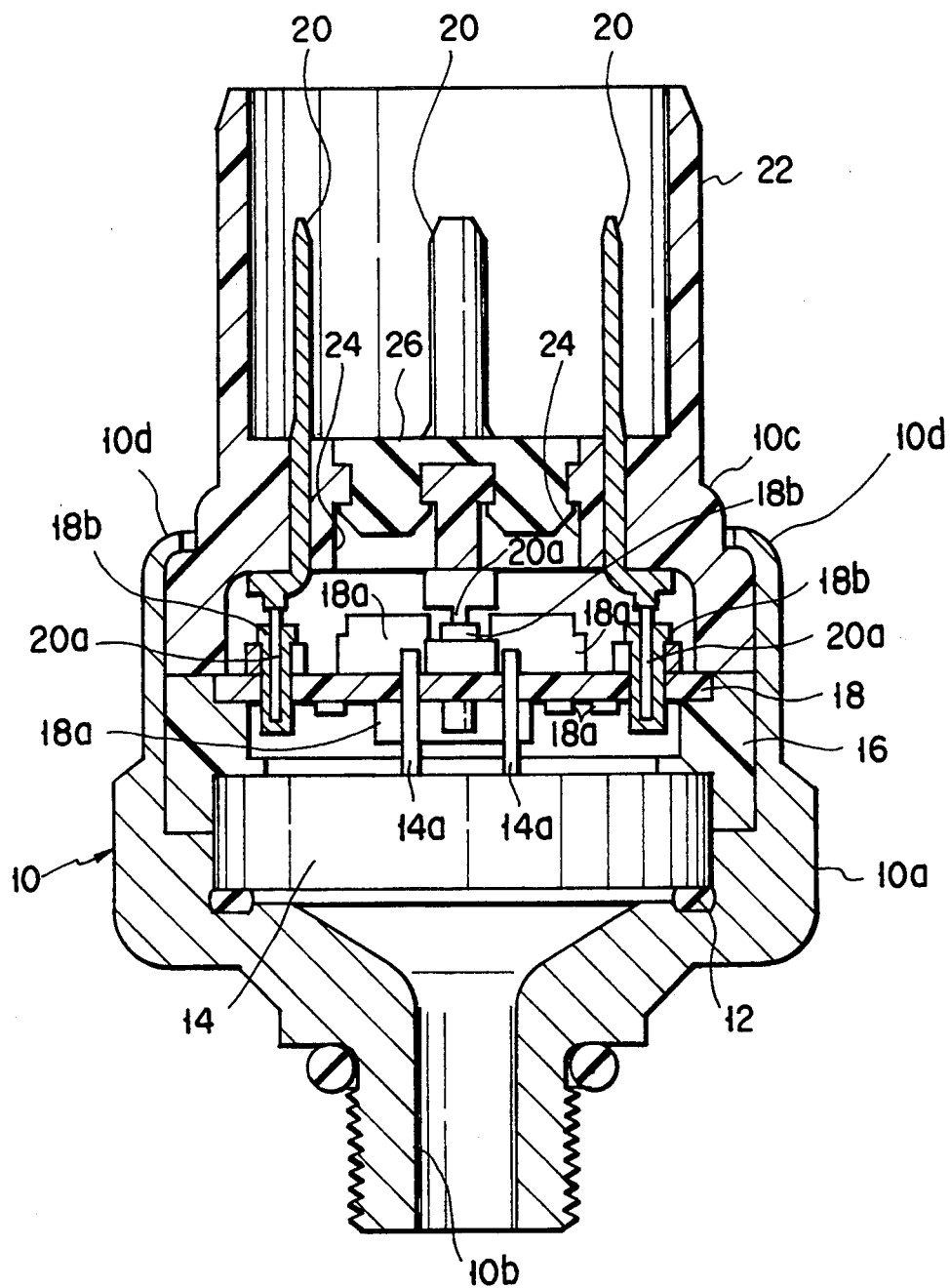
FIG. 1 is a longitudinal sectional view of a conventional pressure sensor.
Figure 2:
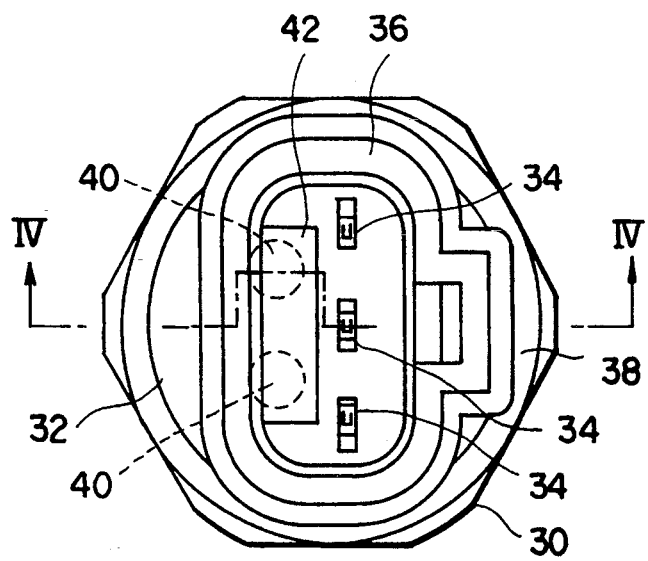
FIG. 2 is a plane view of a pressure sensor according to one embodiment of the present invention.
Figure 3:
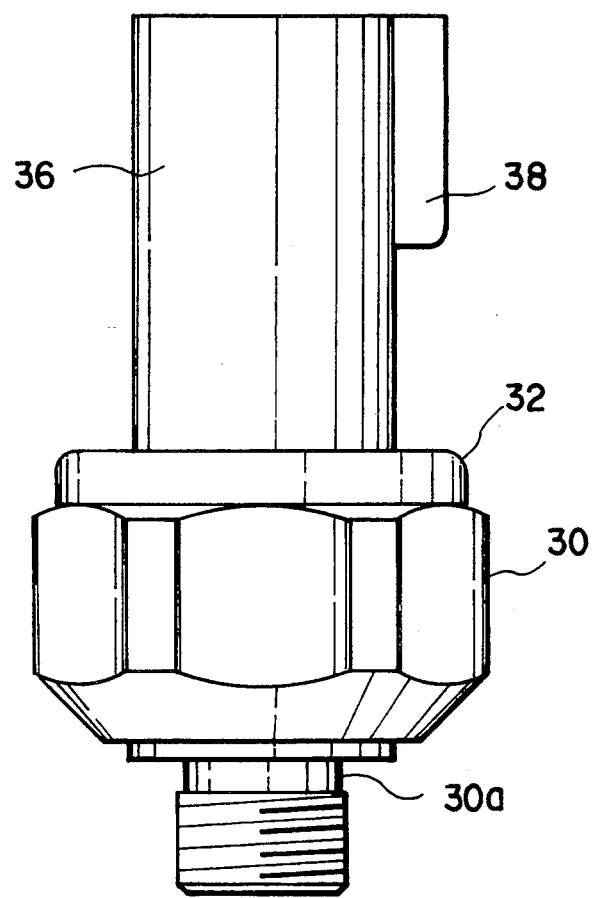
FIG. 3 is a side view of the pressure sensor of FIG. 2.

FIGS. 2 and 3 are a plane view and a side view showing an appearance of a pressure sensor according to one embodiment of the present invention. The appearance of the embodiment is the same as that of another embodiment of a pressure sensor of the present invention, which will be explained later.

In this embodiment, a sheath housing of the pressure sensor is constructed by a metallic first cap-like half housing 30, and a second cap-like half housing 32 which is made of non-conductive plastic material and is connected to the first half housing 30 in a state that an enlarged opening of the first half housing 30 is opposed to an enlarged opening of the second half housing 32.

A fluid channel connecting projection 30a in which a fluid inlet channel adapted to communicate with a fluid passage (not shown) is formed at a top portion of the first half housing 30. The fluid channel connecting projection 30a extends in a direction away from the second half housing 32.

A plurality of outer connection terminals 34 extending from an inner space of the second half housing 32 toward an outer space thereof are supported at a top portion of the second half housing 32. The outer connection terminals 34 extend in a direction away from the first half housing 30.

A socket guiding cylindrical portion 36 is formed on the outer surface of the top portion of the second half housing 32 to surround the plurality of outer connection terminals 34. The socket guiding cylindrical portion 36 also extends in a direction away from the first half housing 30 to be parallel with the plurality of the outer connection terminals 34.

As is obvious from FIG. 2, a horizontal cross section of the socket guiding cylindrical portion 36 is a substantially long and thin rectangle, and prevent a socket (not shown) fitted on the outer peripheral surface of the socket guiding cylindrical portion 36 and electrically connected to the plurality of outer connection terminals 34 of the socket guiding cylindrical portion 36 from rotating in a circumferential direction. An engaging projection 38 is formed on a part of the outer peripheral surface so as to prevent the socket (not shown) from being detached.

In an area surrounded by the socket guiding cylindrical portion 36 at the top portion of the second half housing 32, two openings 40 are formed to allow access to the inner space of the second half housing 32. Two openings 40 are sealed by a con, non detachable rubber cap 42.

Figure 4:
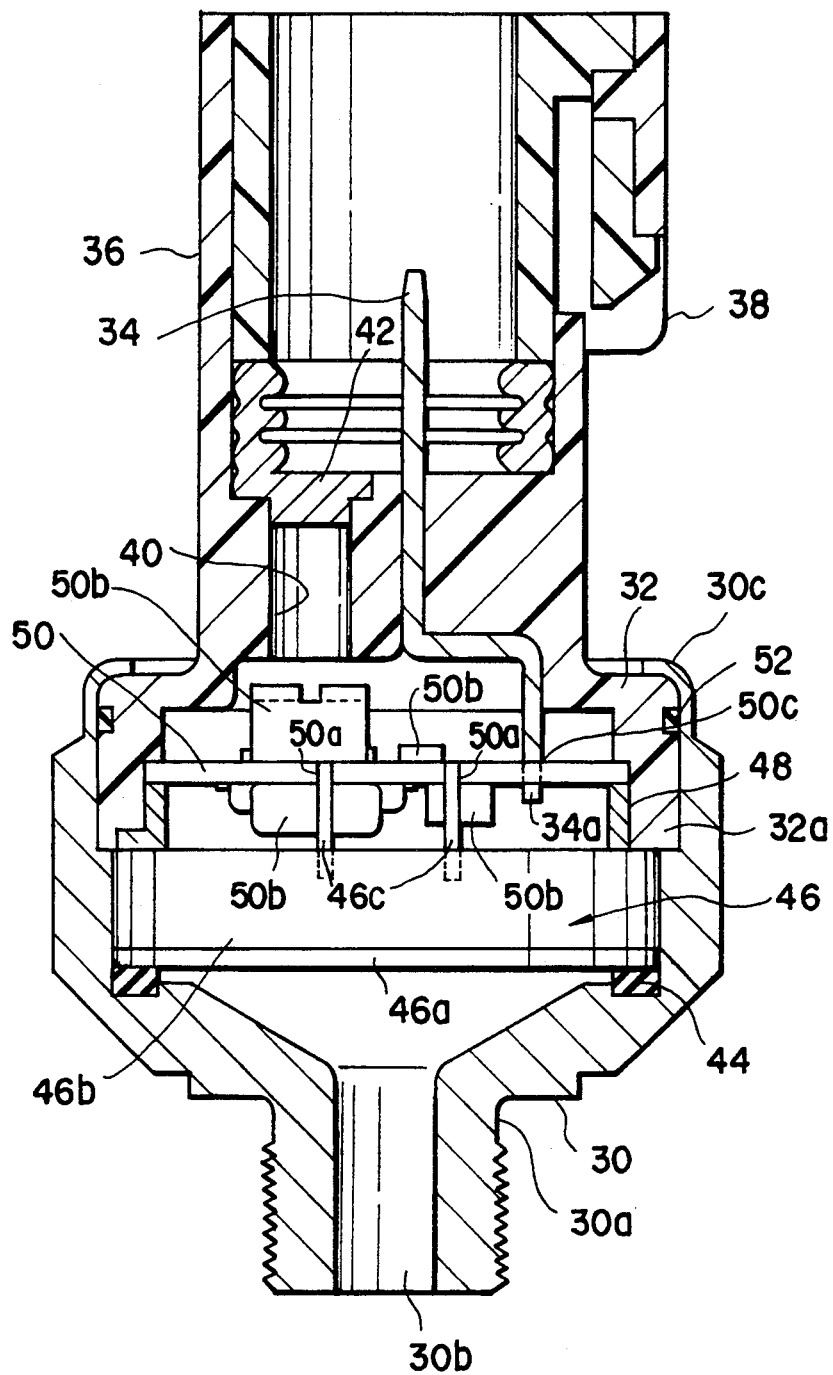
FIG. 4 is a longitudinal sectional view taken along a line IV—IV in FIG. 2.

FIG. 4 is a longitudinal sectional view showing an inner structure of the pressure sensor of the above embodiment whose plane and side views of the appearance are shown in FIGS. 2 and 3.

On the inner peripheral surface of the enlarged opening of the first half housing 30, two steps are formed over the whole circumference. A peripheral edge portion of one side surface of a substantially disc-shaped capacitive pressure transducer 46 is placed on the small diametrical inner step portion with an O-ring 44 interposed therebetween. In other words, the capacitive pressure transducer 46 partitions the inner space of the first half housing 30 at the small diametrical inner step portion of the enlarged opening of the first half housing 30.

The capacitive pressure transducer 46 is constituted by a diaphragm 46a, which forms one side surface facing the fluid inlet channel 30b of the fluid channel connecting projection 30a at the top portion of the first half housing 30, and a base member 46b supporting the peripheral edge portion of the diaphragm 46a. The diaphragm 46a is formed of ceramic material such as alumina, and the base member 46b is formed of non-conductive material such as glass seal material.

The center portion of one side surface of the base member 46b, which faces the diaphragm 46a, is hollowed to be spaced from the diaphragm 46a by a predetermined distance. Metallic films are formed on the bottom surface of the hollow and the hollow facing surface of the central portion of the diaphragm 46a so as to construct a capacitor which changes electrostatic capacity in accordance with a degree of deflection of the central portion of the diaphragm 46a. In other words, since the degree of deflection of the central portion of the diaphragm 46a corresponds to the value of the pressure of the fluid flowed into the fluid inlet channel 30b of the first half housing 30, the capacitor generates the pressure corresponding electrical signal corresponding to the value of the fluid pressure.

Figure 5:
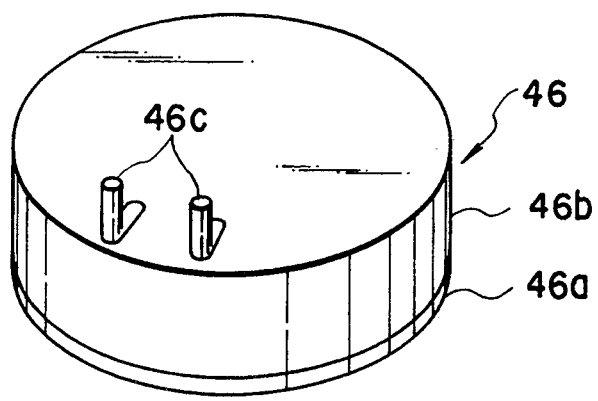
FIG. 5 is a perspective view of a capacitive pressure transducer of the pressure sensor of FIG. 2.
Figure 6:
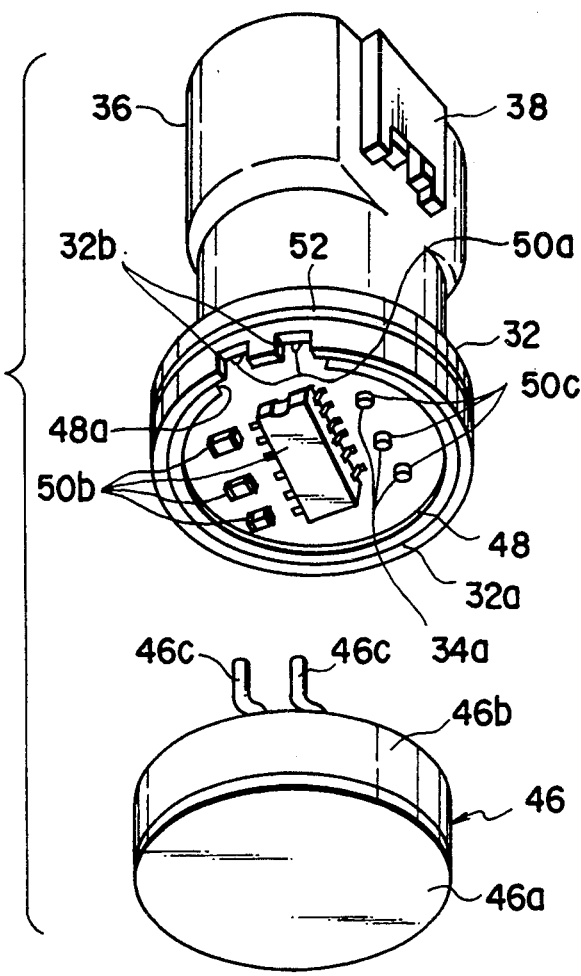
FIG. 6 is an exploded perspective view showing a state that the capacitive pressure transducer is separated from a spacer ring, which is held, together with a circuit board, at a predetermined position in an enlarged opening of a second half housing after a first half housing is separated from the pressure sensor of FIG. 2.

In an edge portion of a back surface of the base 46b opposite the surface which faces the diaphragm 46a, as shown in FIG. 5, a pair of electrical connection terminals 46c project from the capacitor. The electrical connection terminals 46c extend along the other side surface for a little distance and then project in a direction away from the other side surface. In other words, the pair of the electrical connection terminals 46c project from the peripheral edge portion of the back surface of the base member 46b in a state that the each electrical connection terminal 46c is bent in a crank form.

On the peripheral edge portion of the back surface of the base member 46b of the capacitive pressure transducer 46, an annular spacer ring 48 is placed as shown in FIG. 4. The spacer ring 48 is formed of non-conductive material such as polybutylene terephthalete.

A terminal guide opening 48a is notched in the peripheral wall of the spacer ring 48 at the position corresponding to the pair of electrical connection terminals 46c of the capacitive pressure transducer 46. Outer projecting portions of the pair of the electrical connection terminals 46c of the capacitive pressure transducer 46 are contained in the terminal guide opening 48a.

A circuit board 50 is placed on the end surface of the spacer ring 48, being positioned on the back side of the end surface facing the the capacitive pressure transducer 46. The circuit board 50 is formed of such material, for example, ceramic material, that has superior heat resistance and high humidity resistance.

Electrical connection terminal insertion holes 50a are formed in the peripheral edge portion of the circuit board 50 at positions corresponding to the terminal guide opening 48a of the peripheral wall of the spacer ring 48. The outer projecting ends of the pair of the electrical connection terminals 46c contained in the terminal guide opening 48a are inserted into the electrical connection terminal insertion holes 50a, and are electrically connected thereto.

Various types of electrical or electronic parts 50b, which are used to process the pressure corresponding electrical signal sent from the capacitor of the capacitive pressure transducer 46, are electrically connected and fixed to both side surfaces of the circuit board 50.

An end surface of the enlarged opening of the second cap-like half housing 32 is placed on the peripheral edge portion of the surface of the circuit board 50, being positioned on the surface of the circuit board 50 opposite the surface facing the spacer ring 48.

In this embodiment, on the end surface of the enlarged opening of the second half housing 32, a skirt portion 32a is formed to extend along the peripheral surface of the circuit board 50 and the peripheral surface of the spacer ring 48 to the capacitive-pressure-transducer-side end surface of the spacer ring 48. The extended end surface of the skirt portion 32a is placed on the outer large diametrical step portion in the inner peripheral surface of the enlarged opening of the first half housing 30. Two openings 32b are formed in the skirt portion 32a at positions corresponding to the terminal member guide opening 48a of the peripheral wall of the spacer ring 48 to allow access to the outer projected ends of the paired electrical connection terminals 46c inserted in the electrical connection terminal insertion holes 50a of the peripheral edge portion of the circuit board 50.

Moreover, in the circuit board 50, a plurality of electrical connection terminal insertion holes 50c corresponding to base end portions 34a of the plurality of outer connection terminals 34 of the second half housing 32 are formed at a plurality of predetermined positions independent of the electrical connection terminal insertion holes 50a for the pair of the electrical connection terminals 46c of the capacitive pressure transducer 46. The base end portions 34a of the plurality of outer connection terminals 34 are inserted into the electrical connection terminal insertion holes 50c, are electrically connected, and are fixed thereto.

An O-ring 52 is mounted on the outer peripheral surface of the peripheral wall of the second half housing 32. The O-ring 52 seals a gap between the above described outer peripheral surface of the second half housing 32 and the inner peripheral surface of the enlarged opening of the first half housing 30 covering the above described outer peripheral surface.

The second half housing 32 and the first half housing 30 are connected to each other as shown in FIG. 4, by engaging an annular extending portion 30c extending from the enlarged-opening-side end surface of the first half housing 30 with a shoulder portion at the boundary between the top portion and the peripheral wall in the second half housing 32.

On the side surface of the circuit board 50 facing to the top portion of the second half housing 32, electrical or electronic parts 50b such as trimmer capacitor, which needs adjustment after the second half housing 32 and the first half housing 30 are connected to each other as shown in FIG. 4, are arranged at positions oppositing to two openings 40 in the top portion of the second half housing 32.

The trimmer capacitor needs adjustment after the pressure sensor is assembled in order to prevent the trimmer capacitor from being influenced by an outer electric field and a stray capacitance. The electrical or electronic parts 50b such as trimmer capacitor, which needs adjustment, can be adjusted through the two openings 40 before the rubber cap 42 is attached to the two openings 40 of the top portion of the second half housing 32 at the final step of the assembly. After the rubber cap 42 has been attached, the above described adjustment can be done in a condition that the rubber cap 42 is detached.

In the above embodiment, the pair of the electrical connection terminals 46c of the capacitive pressure transducer 45, which are bent in a crank form, can be easily adjusted to ensure the positional accuracy of their outer projected ends. Moreover, the terminal member guide opening 48a of the peripheral wall of the spacer ring 48 makes the insertion work of the outer projected ends of the electrical connection terminals 46c of the transducer 45 into the electrical connection terminal insertion holes 50a of the circuit board 50 easy.

In the actual assembly line of the pressure sensor according to the above embodiment of the present invention, the assembly is performed in the order reverse to the above-mentioned order.

More specifically, the second half housing 32 is set to orient upward its enlarged opening, and the circuit board 50 having various types of electrical or electronic parts 50b is placed on the enlarged opening of the second half housing 32. Then, the electrical connection between the base end portions 34a of the plurality of the outer connection terminals 34 and the plurality of the electrical connection terminal insertion holes 50c of the second half housing 32 is performed. Next, the spacer ring 48 and the capacitive pressure transducer 46 are sequentially stacked on the circuit board 50. The outer projected ends of the pair of the electrical connection terminals 46c of the capacitive pressure transducer 46 are inserted into the electrical connection terminal insertion hole 50a of the peripheral edge portion of the circuit board 50, and the electrical connection between the outer projected ends of the paired electrical connection terminals 46c and the electrical connection terminal insertion holes 50a is surely performed by a soldering device using, for example, a light beam or an electrical heater through the openings 32b of the skirt portion 32a of the enlarged-opening-side end surface of the second half housing 32 and the terminal member guide opening 48a of the peripheral wall of the spacer ring 48. Finally, the enlarged opening of the first half housing 30 is put on the enlarged opening of the second half housing 32, and the connection therebetween can be performed.

Figure 7:
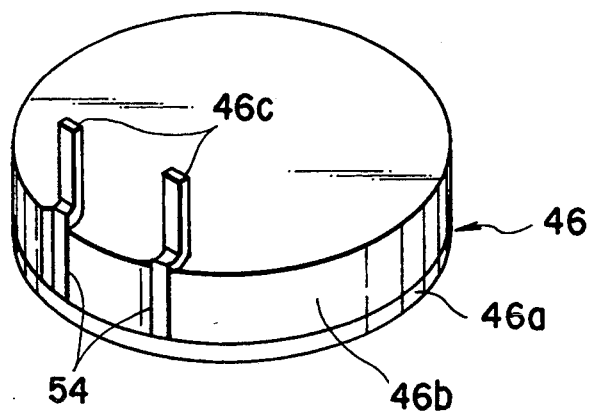
FIG. 7 is a perspective view showing a modification of the capacitive pressure transducer.

FIG. 7 is a modification of the capacitive pressure transducer 46 used in the pressure sensor of the above-mentioned embodiment.

In this modification, the pair of electrical connection terminals 46c are drawn from the boundary between the diaphragm 46a and the base member 46b to the peripheral surface of the base member 46b. Then, the electrical connection terminals 46c are contained in a groove 54, which is formed in the peripheral surface of the base member 46b to extend from the diaphragm-side side surface thereof to the circuit-board-side side surface thereof. Further, the electrical connection terminals 46c are bent radially inward along the circuit-board-side side surface. Finally, the electrical connection terminals 46c are raised to project in a direction away from the circuit-board-side side surface.

In this modification, the paired electrical connection terminals 46c are bent in a crank form at the side surface of the base member 46b. Therefore, the capacitive pressure transducer 46 of the modification can obtain the same technical advantages as those of the capacitive pressure transducer 46 used in the pressure sensor of the previously-mentioned embodiment.

Another Embodiment

The following will explain a pressure sensor of another embodiment of the present invention and various modifications of a capacitive pressure transducer used in the pressure sensor with reference to FIGS. 8 to 10B.

The difference between the pressure sensor of one embodiment explained with reference to FIGS. 2 to 7 and that of another embodiment to be explained is only the structure for the electrical connection between the capacitive pressure transducer 46, stored in the inner spaces of the first and second half housings 30 and 32, and the circuit board 50. Therefore, only the different structure will be explained and the same reference numerals are added to the portions of another embodiment common to those of one embodiment, and the detailed explanation thereto will be omitted.

In the pressure sensor of another embodiment, as shown in FIGS. 8 and 9, a pair of electrical connection terminals 60 of the capacitive pressure transducer 46 are arranged on the inner peripheral surfaces of openings 62 formed in the peripheral edge portion of the cirucit-board-side side surface of the base member 46b. On the circuit board 50, a pair of rod-like electrical connection terminals 64 are projected from positions corresponding to the electrical connection terminals 60 to the electrical connection terminals 60. Projected end portions of the pair of rod-like electrical connection terminals 64 of the circuit board 50 are inserted into the openings 62 of the capacitive pressure transducer 46 and are electrically connected to the pair of electrical connection terminals 60.

More specifically, the openings 62 are constructed by a pair of notches, which are independently formed from the peripheral edge portion of the side surface of the base member 46b to the peripheral surface thereof. The pair of electrical connection terminals 60 are arranged on the inner surfaces of the notches.

An area of the side surface opening portion of each of the pair of notches is much larger than each horizontal cross-sectional area of the pair of electrical connection terminals 64 of the circuit board 50. Therefore, the projected end portions of the pair of electrical connection terminals 64 of the circuit board 50 can be easily inserted into the side surface opening portion of the pair of notches.

Moreover, the peripheral side opening portions of the pair of notches, each of which is largely cut, makes soldering work, which ensures the electrical connection between the projected end portions of the pair of electrical connection terminals 64 of the circuit board 50 and the pair of electrical connection terminals 60 of the inner peripheral surfaces of the pair of openings 62, being easy.

In other words, just before the first half housing 30 is finally put on the second half housing 32 for the mutual connection therebetween in the final step of the assembly of the pressure sensor of another embodiment, the soldering work can be easily performed through the peripheral surface side opening portions.

FIG. 10A shows a first modification of the capacitive pressure transducer 46 used in the pressure sensor of the above described another embodiment.

In this modification, an opening 62a for a pair of electrical connection terminals 64 of the circuit board 50 is formed in the base member 46b of the capacitive pressure transducer 46. The opening 62a is constructed by one large notch notched from the peripheral edge portion of the side surface of the base member 46 to the peripheral surface thereof. The pair of electrical connection terminals 60 of the capacitive pressure transducer 46 are arranged at two mutually spaced positions on the inner peripheral surface of the above described one large notch.

According to this modification, the same technical advantages as those of the capacitive pressure transducer 46 shown in FIG. 9. In addition, one large sized opening for the projected end portions of the pair of the electrical connection terminals 64 of the circuit board 50 can be easily formed. Moreover, the insertion work of the projected end portions of the pair of the electrical connection terminals 64 of the circuit board 50 to the notched side surface opening portion of the above described one large sized opening can be easily performed.

Furthermore, in the first modification, one more notch 62a' having the same size and shape as those of the opening 62a is formed in the base member 46b of the capacitive pressure transducer 46 at a position radially symmetrical to the above described one large sized opening 62a. If only one large sized opening 62a is formed in the base member 46b and the base member 46b is non-symmetically shaped, distortion is generated in the size of the base member 46b when the base member 46b is formed by calcining ceramic material. The reason why one more large sized notch 62a' is formed is that the base member 46b has symmetrical shape, so thai distortion is prevented from being generated in the size of the base member 46b.

FIG. 10B shows a second modification of the capacitive pressure transducer 46 used in the pressure sensor of the above described another embodiment.

In the second modification, two blind openings 62b are independently formed in the circuit-board-side side surface of the base member 46b of the capacitive pressure transducer 46 to receive the pair of electrical connection terminals 64 of the circuit board 50. The pair of electrical connection terminals 60 of the capacitive pressure transducer 46 are arranged in the inner peripheral surfaces of the two blind openings 62b.

FIG. 10C shows a third modification of the capacitive pressure transducer 46 used in the pressure sensor of the above described another embodiment.

In the third modification, two bent openings 62c are independently formed in the base member 46b of the capacitive pressure transducer 46 to receive the pair of electrical connection terminals 64 of the circuit board 50. Both ends of each of the two bent openings 62c are opened in the circuit-board-side side surface and the peripheral surface of the base member 46b. The pair of electrical connection terminals 60 of the capacitive pressure transducer 46 are arranged in the inner peripheral surfaces of the peripheral surface side opening portions of the bent openings 62c.

In this modification, the electrical connection work between the pair of electrical connection terminals 60 of the capacitive pressure transducer 46 in the peripheral surface opening portions of the two bent openings 62c and the projected end portions of the pair of the electrical connection terminals 64 of the circuit board 50 inserted into the side surface opening portions of the two bent openings 62c by soldering therebetween can be easily performed through the peripheral surface side opening portions just before the enlarged opening of the first half housing 30 is put on the enlarged opening of the second half housing 32 to be mutually connected with each other in the final step of the assembly of the pressure sensor of the above described another embodiment.

Figure 11A:
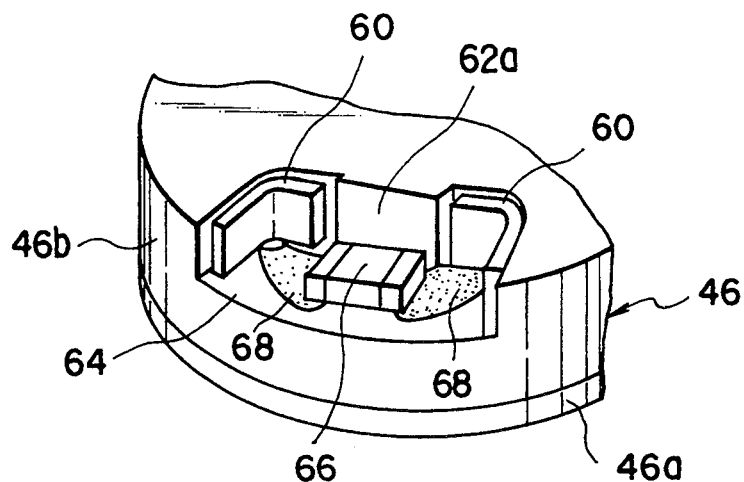
FIG. 11A is a perspective view of a fourth modification of the capacitive pressure transducer of the pressure sensor of FIG. 8.

FIG. 11A shows a fourth modification of the capacitive pressure transducer 46 used in the pressure sensor of the above described another embodiment.

In this modification, similar to the first modification shown in FIG. 10A, the opening 62a for the pair of electrical connection terminals 64 of the circuit board 50 is constructed by one large sized notch notched from the peripheral edge portion of the circuit-board-side side surface to the peripheral surface of the base member 46. The pair of electrical connection terminals 60 of the conductive pressure transducer 46 are arranged at the mutually spaced positions on the inner peripheral surface of the above described one large sized notch.

Moreover, in this modification, an electrical or electronic part such as a fixed capacitor of surface mounting type is arranged on an inner bottom surface 64 of the opening 62a constructed by the above described one large sized notch. The electrical or electronic part is electrically connected to a conductive pattern 68, which has been printed on the inner bottom surface 64, by, for example, solder. Also, the electrical or electronic part is electrically connected to the pair of electrical connection terminals 60 on the inner peripheral surface of the opening 62 through the conductive pattern 68.

Figure 11B:
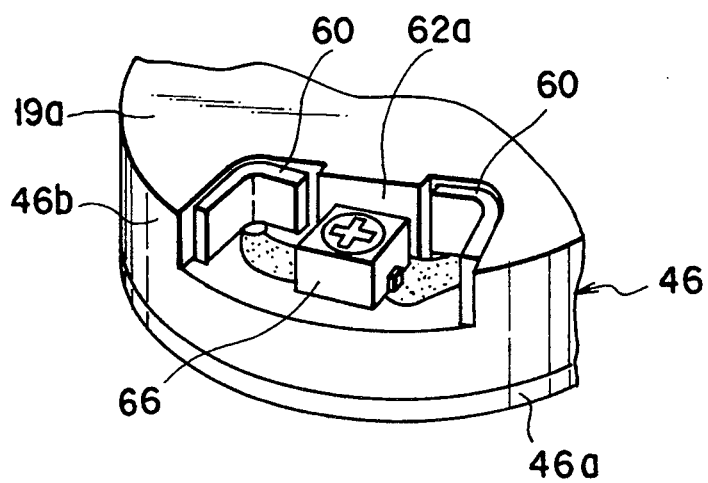
FIG. 11B is a perspective view of a fifth modification of the capacitive pressure transducer of the pressure sensor of FIG. 8.

FIG. 11B shows a fifth modification of the capacitive pressure transducer 46 used in the pressure sensor of the above described another embodiment.

In this modification, in place of the fixed capacitor 66 of surface mounting type of the fourth modification of FIG. 11A, a trimmer capacitor 70 of surface mounting type is electrically connected, by for example solder, to the conductive pattern 68 which has been formed in the inner bottom surface 64 of the opening 62a constructed by the above described one large sized notch. Also, the trimmer capacitor 70 is electrically connected to the pair of electrical connection terminals 60 on the inner peripheral surface of the opening 62 through the conductive pattern 68.

In this modification, an opening is formed in the peripheral edge portion of the circuit board 50 at a position oppositing to the trimmer capacitor 70, and the opening is positioned to be opposed to one of the two openings 40 of the top portion of the second half housing 32, or one more opening, which is independent of the two openings 40, is formed in the top portion of the second half housing 32 to be opposed to the opening of the peripheral edge portion of the circuit board 50. Thereby, the trimmer capacitor 70 can be adjusted from the outer space of the pressure sensor after the pressure sensor of the above described another embodiment has been assembled. In this case, it is preferable that the independent one more opening is normally sealed by a detachable cap, similar to the two openings 40.

As shown in fourth and fifth modifications of FIGS. 11A and B, the arrangement of the electrical or electronic part onto the inner bottom surface 64 of the opening 62a in the base member 46b of the capacitive pressure transducer 46 increase the degree of freedom in the arrangement of the electrical or electronic parts on the both side surfaces of the circuit board 50. Moreover, by arranging the highest electrical or electronic part on the inner bottom surface 64, the height of the projections of the electrical or electronic parts from the capacitive-pressure-transducer-side side surface of the circuit board 50 can be reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A pressure sensor comprising:
   a first cap-like half housing which has a fluid inlet channel at its top portion;
   a capacitive pressure transducer which is mounted on an enlarged opening of the first half housing, wherein the capacitive pressure transducer airtightly partitions the enlarged opening and has a terminal member extending in a direction away from the fluid inlet channel of the first half housing;
   an annular spacer ring which is placed on a peripheral edge portion of a back surface of the capacitive pressure transducer opposite to a front surface of the capacitive pressure transducer, wherein the front surface faces the fluid inlet channel;
   a circuit board which is placed on a surface of the spacer ring facing away from the capacitive pressure transducer, wherein the circuit board has a first electrical connection terminal insertion hole and a second electrical connection terminal insertion hole, wherein the second electrical connection terminal insertion hole is independent of the first electrical connection terminal insertion hole and receives an elongated portion of the terminal member of the capacitive pressure transducer; and
   a second cap-like half housing which supports an outer connection terminal, wherein the second cap-like half housing is placed on a peripheral edge portion of a surface of the circuit board facing away from the spacer ring, and wherein the second cap-like half housing is engaged with the first half housing so that an end portion of the outer connection terminal is inserted into the first electrical terminal insertion hole of the circuit board, and so that the capacitive pressure transducer, the spacer ring, and the circuit board are sandwiched by the first and second cap-like half housings,
   wherein the terminal member of the capacitive pressure transducer is bent like a crank, and wherein a terminal member guiding portion is formed in a peripheral wall of the spacer ring to receive the terminal member of the capacitive pressure transducer and to guide the terminal member to the second electrical connection terminal insertion hole of the circuit board.

2. The pressure sensor according to claim 1, wherein an opening is formed in a part of the terminal member guiding portion of the peripheral wall of the spacer ring to allow access from an outer space to the extending end portion of the terminal member and the electrical connection hole of the circuit board.

3. A pressure sensor comprising:
   a first cap-like half housing which has an enlarged opening and a fluid inlet channel at a top portion of the first cap-like half housing;
   a capacitive pressure transducer which is mounted on the enlarged opening of the first cap-like half housing, wherein the capacitive pressure transducer airtightly partitions the enlarged opening of the first cap-like half housing;
   an annular spacer ring which is placed on a peripheral edge portion of a back surface of the capacitive pressure transducer facing away from the fluid inlet channel;
   a circuit board which is placed on a back surface of the spacer ring facing away from the capacitive pressure transducer, wherein the circuit board has an electrical connection terminal insertion hole;
   electrical connection means for electrically connecting the capacitive pressure transducer to the circuit board; and
   a second cap-like half housing which supports an outer connection terminal, wherein the second cap-like half housing is placed on a peripheral edge portion of a back surface of the circuit board facing away from the spacer ring and is engaged with the first half housing, and wherein an end portion of the outer connection terminal is inserted into the electrical terminal insertion hole of the circuit board, and the capacitive pressure transducer, the spacer ring, and the circuit board are sandwiched by the first and second half housings, wherein
   the electrical connection means includes a rod-like terminal member projecting from the circuit board toward the capacitive pressure transducer, and wherein the capacitive pressure transducer has an opening into which the projected end of the terminal member of the circuit board is inserted, the cross-sectional area of the opening in the capacitive pressure transducer being greater than the cross-sectional area of the terminal member, and wherein the capacitive pressure transducer has an electrical connection terminal positioned in the opening and electrically connected to the projected end of the terminal member.

4. The pressure sensor according to claim 3, wherein the opening in the capacitive pressure transducer has opening portions in the back surface and in a side surface of the capacitive pressure transducer and wherein the electrical connection terminal is arranged on an inner peripheral surface of the opening in the capacitive pressure transducer.

5. The pressure sensor according to claim 4, wherein a portion of the capacitive pressure transducer between the opening portion in a back surface of the capacitive pressure transducer and the opening portion in a side surface of the capacitive pressure transducer are cut out.

6. The pressure sensor according to claim 3, wherein the circuit board further includes a first terminal member for the capacitive pressure transducer, and wherein the opening in the capacitive pressure transducer is formed such that the respective projected ends of the first terminal member and a second terminal member are inserted therein, the cross-sectional are of the opening being greater than the combined cross-sectional areas of the first and second terminal members and wherein a plurality of electrical connection terminals corresponding to the respective projected ends of the above described first and second terminal members are arranged on an inner peripheral surface of the opening.

7. The pressure sensor according to claim 6, wherein at least one electronic part is electrically connected to the plurality of electrical connection terminals and is arranged between the plurality of the electrical connection terminals.

* * * * *

UNITED STATES PATENT AND TRADEMARK OFFICE
CERTIFICATE OF CORRECTION

PATENT NO. : 5,343,757
DATED : Sept. 6, 1994
INVENTOR(S) : Kikuo TATE

It is certified that error appears in the above-identified patent and that said Letters Patent is hereby corrected as shown below:

IN THE ABSTRACT:  Line 1, after "connected" insert --to--.
Line 7, before "receiving" insert --each--; change "terminals" to --terminal--.
Line 8, change "is" to --are--.

| Column | Line | |
|---|---|---|
| 3 | 34-35 | Change "ensure" to --secures--. |
| 4 | 21 | Change "an accurately and relatively positional" to --the need to make an accurate and relative positional--. |
| 4 | 47 | Change "surely" to --reliabily--. |
| 5 | 8 | Change "works" to --steps--. |

UNITED STATES PATENT AND TRADEMARK OFFICE
CERTIFICATE OF CORRECTION

PATENT NO. : 5,343,757
DATED : 6 September 1994
INVENTOR(S) : Kikuo TATE It is certified that error appears in the above-identified patent and that said Letters Patent is hereby corrected as shown below:

| Column | Line | |
|---|---|---|
| 5 | 23 | Change "relative" to --relatively--. |
| 6 | 56 | Change "prevent" to --prevents--. |
| 7 | 1 | Change "con, non" to --common--. |
| 7 | 5 | Delete "of the appearance". |
| 7 | 67 | Delete "the" (second occurrence). |
| 9 | 3 | Change "opposing" to --opposite--. |
| 9 | 10 | Change "needs" to --need--. |
| 9 | 49 | Change "surely" to --reliably--. |
| 10 | 38 | Delete "to the electrical connection terminals 60". |

UNITED STATES PATENT AND TRADEMARK OFFICE
CERTIFICATE OF CORRECTION

PATENT NO.   : 5,343,757
DATED        : 6 September 1994
INVENTOR(S)  : Kikuo TATE It is certified that error appears in the above-identified patent and that said Letters Patent is hereby corrected as shown below:

| Column | Line | |
|--------|------|---|
| 10 | 66 | Delete "being". |
| 11 | 19 | After "modification," insert --there exist--. |
| 11 | 41 | Change "thai" to --that--. |
| 12 | 58 | Change "oppositing" to --opposite--; after "capacitor" delete "70". |
| 12 | 65 | Delete "70". |
| 13 | 7 | Change "increase" to --increases--. |
| 14 | 67 | Change "are" to --area--. |

Signed and Sealed this

Eleventh Day of April, 1995

Attest:

BRUCE LEHMAN

*Attesting Officer*    Commissioner of Patents and Trademarks